UNITED STATES PATENT OFFICE.

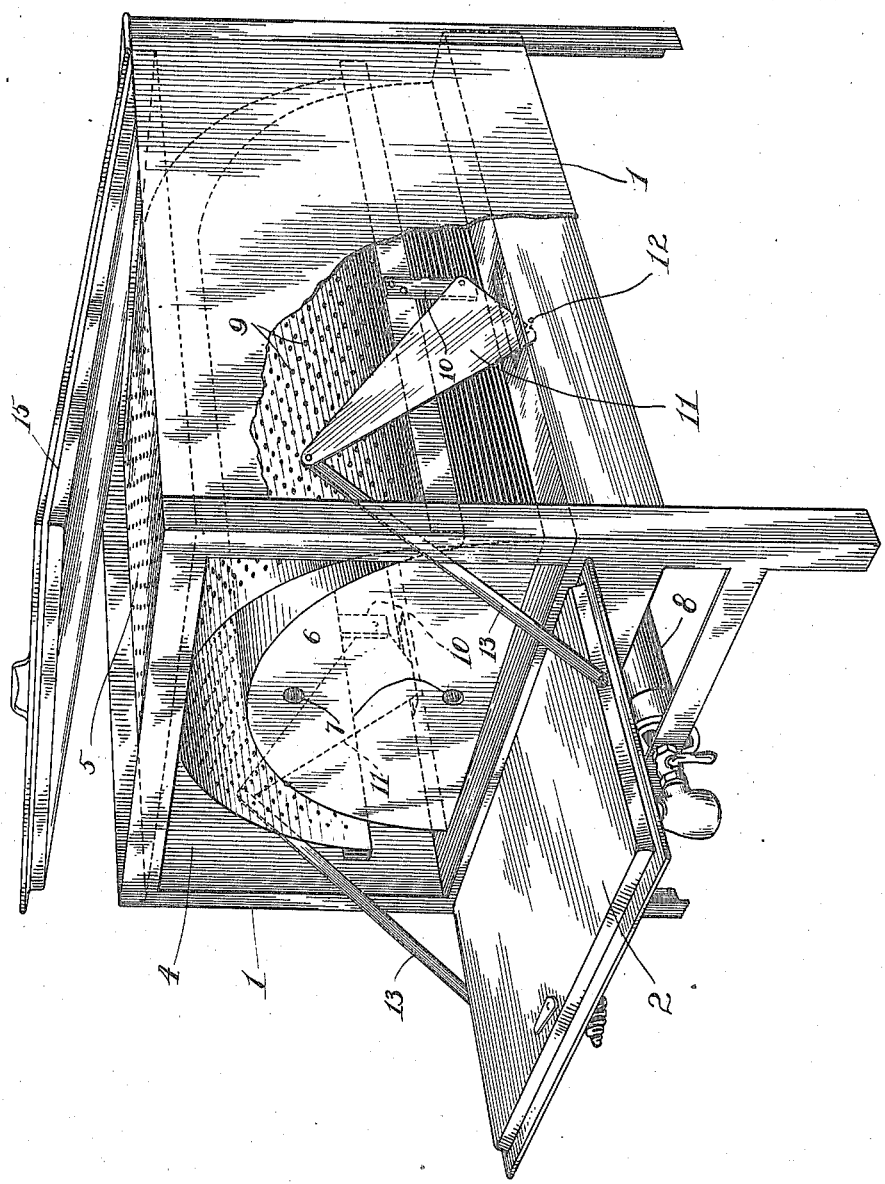

SAMUEL TULLY WILLSON, OF BROOKLYN, NEW YORK.

MATRIX-SCORCHING OVEN.

1,393,473.  Specification of Letters Patent.  Patented Oct. 11, 1921.

Application filed August 11, 1919. Serial No. 316,757.

*To all whom it may concern:*

Be it known that I, SAMUEL TULLY WILLSON, a citizen of the United States, residing at Brooklyn, in the county of Kings and State of New York, have invented certain new and useful Improvements in Matrix-Scorching Ovens; and I do hereby declare the following to be a full, clear, and exact description of the invention, such as will enable others skilled in the art to which it appertains to make and use the same.

This invention relates to a matrix baking and scorching oven wherein a baking compartment or compartments are provided, which are adapted to receive a flat or a semi-cylindrical matrix.

Heretofore, semi-cylindrical matrices have customarily been baked while in a flat condition and after being properly hardened have then been bent to the curved form to fit the cylinder of the casting box. But this bending operation after hardening has had the tendency of unduly warping and cracking the matrix to its detriment in use.

To overcome this objection is the principal object of this invention, and a further object is to provide a device combining two compartments; one for baking a matrix in its curved form and one for baking a matrix in its flat form.

The manner in which these objects are attained is disclosed in this specification taken in conjunction with the accompanying drawing in which a perspective view of the device is shown. The view is partly broken away better to illustrate the interior of the device.

Referring in detail to the parts, 1 designates an oven housing provided with a door 2 at one end and is formed with lower and upper compartments 4 and 5 respectively.

The bottom of the lower compartment is formed with an opening which is bridged by a semi-cylindrical bed or holding member 6 formed with air apertures 7. Any suitable heating means, preferably a gas burner 8, is provided beneath the dome.

A perforated arcuate shaped hood 9 is mounted between the semi-cylindrical bed and top of the lower compartment and held in place by depending bars 10 which are pivotally attached to rocking members 11 in turn pivoted to the oven frame as at 12. The upper ends of the rocking members are pivotally attached to one end of connecting rods 13 and the door 2 is pivotally connected to the connecting rods at their other ends as clearly shown.

The partition between the upper and lower compartments is preferably perforated as shown and a lid or cover 15 is provided to act as a closing member for the upper compartment.

In the operation of baking a matrix with the device described, the matrix, having been formed by impression in the usual manner, is bent to the desired arcuate form and placed upon the semi-cylindrical bed whereupon the door is closed and operates to bring the arcuate perforated hood down upon the matrix.

Heat is applied, by gas or other means and the matrix allowed to remain within the oven until the baking or scorching process is completed. The connecting means between the door and arcuate hood operates to bring the hood against the matrix and prevents warping and cracking while the baking process endures.

At the completion of the baking, the door is opened, which operation raises the hood thereby allowing the finished matrix to be withdrawn.

A flat matrix may be baked in the upper compartment when placed therein and the lid-door closed.

Particular attention is called to the connections between the arcuate hood 9 and its operating members. The depending bars 10 are secured centrally upon the side edges of the hood, in the manner shown so that binding of the hood, in its movement is prevented.

It is obvious that various other modifications may be embodied in this invention without departing from the spirit of same. This invention is therefore not limited to the particular construction shown.

What is claimed :—

1. In a matrix scorching oven, a housing having a baking compartment therein, a closing member provided for the baking compartment, a semi-cylindrical member within the compartment formed with an arcuate holding surface, means for heating the said compartment and semi-cylindrical member, means for holding a matrix in place on the semi-cylindrical member, and means for causing the holding means and the semi-cylindrical member to be always in position to receive a matrix when the closing member is open, 2. In a matrix scorching oven, a housing having a baking compartment therein, a closing member provided for the baking compartment, a stationary semi-cylindrical member within the compartment formed with an arcuate holding surface upon which a formed matrix is adapted to rest, an arcuate hood movably supported within the compartment independently of the semi-cylindrical member and adapted to engage over the semi-cylindrical member and against the matrix held thereon, and means for heating the compartment and semi-cylindrical member.

3. In a matrix scorching oven, a housing having a baking compartment therein, a closing member provided for the baking compartment, means for heating the compartment, a matrix supporting member, means for holding a matrix in place on the supporting member, and means for separating the supporting member and the holding means when the closing member is opened.

4. The device of claim 2 wherein the arcuate hood is operable by connections with the closing member of the compartment.

5. The device of claim 2 wherein the arcuate hood is perforated.

6. In a matrix scorching oven, a housing formed with upper and lower baking compartments, closing members provided for the baking compartments, a semi-cylindrical member within the lower compartment formed with an arcuate holding surface, and means for heating the said compartment and semi-cylindrical member.

7. In a matrix scorching oven, a housing formed with upper and lower baking compartments, closing members provided for the baking compartments, a semi-cylindrical member within the lower compartment formed with an arcuate holding surface upon which a formed matrix is adapted to rest, an arcuate hood movably mounted within the lower compartment and adapted to engage over the semi-cylindrical member and against the matrix held thereon, and means for heating the compartments and semi-cylindrical member.

8. The device of claim 7 wherein the arcuate hood is operable by connections with the closing member of the lower compartment.

9. The device of claim 7 wherein the arcuate hood is perforated.

In testimony whereof I affix my signature.

SAMUEL TULLY WILLSON.